(12) United States Patent
Burton et al.

(10) Patent No.: US 7,703,654 B2
(45) Date of Patent: Apr. 27, 2010

(54) COUNTER-ROTATING SPINDLE FOR FRICTION STIR WELDING

(75) Inventors: Kurt A. Burton, Wildwood, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 627 days.

(21) Appl. No.: 11/053,630

(22) Filed: Feb. 7, 2005

(65) Prior Publication Data

US 2006/0102699 A1 May 18, 2006

Related U.S. Application Data

(60) Provisional application No. 60/628,832, filed on Nov. 17, 2004.

(51) Int. Cl.
*B23K 20/12* (2006.01)
(52) U.S. Cl. .................................. 228/2.1; 228/112.1
(58) Field of Classification Search ............... 228/2.1, 228/2.3, 112.1, 114.5; 156/73.5
See application file for complete search history.

(56) References Cited

U.S. PATENT DOCUMENTS

| 5,460,317 | A | 10/1995 | Thomas et al. |
| 5,893,507 | A * | 4/1999 | Ding et al. ................. 228/2.1 |
| 2003/0201307 | A1 | 10/2003 | Waldron et al. |
| 2005/0045695 | A1 * | 3/2005 | Subramanian et al. ... 228/112.1 |

FOREIGN PATENT DOCUMENTS

| EP | 1557233 | | 7/2005 |
| JP | 2002120076 | * | 4/2002 |
| JP | 2003311441 | | 11/2003 |
| WO | 03064100 | | 8/2003 |

OTHER PUBLICATIONS

E. R. Watts, D. G. Staines, W. M. Thomas, E. D. Nicholas "Dual-rotation stir welding—preliminary trials", published on the Internet Apr. 8, 2004, http://www.twi.co.uk/j32k/unprotected/pdfs/sperwapr2004.pdf.
International Search Report mailed Apr. 6, 2006.

* cited by examiner

*Primary Examiner*—Jessica L. Ward
*Assistant Examiner*—Nicholas P D'Aniello
(74) *Attorney, Agent, or Firm*—Hope Baldauff Hartman, LLC

(57) ABSTRACT

A counter-rotating spindle includes a shoulder tool, a pin tool inserted in the shoulder tool, a first motor that is connected with the pin tool and rotates the pin tool, and a second motor that is connected with the shoulder tool and rotates the shoulder tool. The direction and the speed of the rotation for the pin tool may be selected independently from the speed and direction of rotation of the shoulder tool enabling optimization of the friction stir welding process. Counter-rotating the pin tool and the shoulder tool may improve the mixing abilities and efficiency of the pin tool and may prevent the galling effect between the pin tool and the shoulder tool. The counter-rotating spindle may be used, for example, for continuous path friction stir welding and spot welding of aluminum and its alloys, including cast alloys, as well as joining similar and dissimilar alloys.

6 Claims, 6 Drawing Sheets

COUNTER-ROTATING SPINDLE FOR FRICTION STIR WELDING

CROSS REFERENCE TO RELATED APPLICATIONS

This application claims the benefit of the U.S. Provisional Application No. 60/628,832, filed Nov. 17, 2004.

BACKGROUND OF THE INVENTION

The present invention generally relates to friction stir welding tools and welding processes, more particularly, to a counter-rotating spindle for friction stir welding, to a continuous path friction stir welding process, and to a process for spot welding.

Welding may be the most common way of permanently joining metal parts. Friction stir welding (FSW) was introduced in late 1991 by the TWI Welding institute, U.K. (U.S. Pat. No. 5,460,317). In friction stir welding, a cylindrical, shouldered tool with a profiled pin is rotated and slowly plunged onto the work-pieces of sheet or plate material, which are lapped or butted together. The work-pieces have to be clamped rigidly onto a backing bar or engineered substructure in a manner that prevents the abutting joint faces from being forced apart. Frictional heat is typically generated between the wear resistant welding tool and the material of the work-pieces. This heat, along with the heat generated by the mechanical mixing process and the adiabatic heat within the material, causes the stirred materials to soften without reaching the melting point, allowing the traversing of the welding tool along the weld line. The plasticized material is transferred from the leading edge of the tool to the trailing edge of the tool pin and is forged by the intimate contact of the tool shoulder and the pin profile. The welding of the material is facilitated by severe plastic deformation in the solid state involving dynamic recrystallization of the base material. A solid phase bond between the two work-pieces is created. The friction stir welding process can be regarded as a solid phase keyhole welding technique since a hole to accommodate the pin of the tool is generated and then filled during the welding sequence. Since the friction stir welding process takes place in the solid phase below the melting point of the materials to be joined, materials that are difficult to weld using traditional fusion welding methods can now be joined, for example, 2000 and 700 aluminum alloys. Other advantages include, for example, excellent mechanical properties of the weld, usage of a non-consumable tool, and elimination of the need for consumable welding products. The described friction stir welding process using a tool with a fixed pin length has the disadvantages of only being able to join work-pieces having the same thickness, and of leaving a keyhole in the work-piece when the pin is retracted at the end of the weld line. This hole must be covered, for example, with a rivet in order to preserve the integrity of the weld. Furthermore, the friction stir welding process is usually used to produce straight-line continuous path welds. Due to the forming of the keyhole when retracting the tool, friction stir welding is typically not used for spot welding. The friction stir welding process can be used for the manufacture of many joint geometries, such as butt welds, overlap welds, T-sections, fillet, and corner welds. For each of these joint geometries specific tool designs are required.

An auto-adjustable pin tool for friction stir welding was developed by engineers at Marshall Space Flight Center of the National Aeronautics and Space Administration (NASA) (U.S. Pat. No. 5,893,507). The retractable pin tool (RPT) uses a computer-controlled motor to incrementally retract the pin into the shoulder of the tool away from the work-piece at the end of the weld preventing keyholes. The design of the tool allows the pin angle and length to automatically adjust to changes in material thickness and results in a smooth hole closure at the end of the weld. Current retractable pin tools utilize two separate parts, a shoulder and a pin. The pin is positioned within the shoulder. When welding the rotating pin enters the work-pieces to be welded and stirs the material while the shoulder impacts the surface of the work-pieces. Since there is a tolerance between the shoulder and the pin, hot material may be able to migrate up the shaft between shoulder and pin during the welding process. Once the migrated material cools it may temporary and locally weld the pin to the shoulder. This galling effect may damage the surfaces of the pin and/or the shoulder. In all known retractable pin tool applications the pin and shoulder rotate at the same speed and in the same direction. In some applications, depending on the material to be welded, overheating or even melting along the work-piece surface close to the shoulder may occur that may be caused by the rotation of the shoulder. This can lead to undesirable fusion related defects of the work-piece surface.

As can be seen, there is a need for a friction stir welding tool that may be used for a variety of joint geometries, that eliminates the galling effect between the shoulder and the pin during the welding process, and that eliminates overheating of the work-piece surface close to the shoulder of the tool. Furthermore, there is a need for a friction stir welding tool that may be used to reduce the surface indent during the friction stir spot welding process. Moreover, there is a need for a friction stir welding process that produces welds with improved smoothness over the entire length and with improved durability of the joints.

There has, therefore, arisen a need to provide a versatile friction stir welding spindle. There has further arisen a need to provide a stir friction welding spindle that enables an improved mixing of the materials to be welded. There has still further arisen a need to provide a process for friction stir welding producing continuous path welds that have optimized mechanical properties and are smooth over the entire length. There has still further arisen a need to improve the friction stir spot welding process by reducing material loss, by reducing surface indent, and by eliminating weld nugget voids.

SUMMARY OF THE INVENTION

The present invention provides a counter-rotating spindle for friction stir welding, a continuous path friction stir welding process, and a process for spot welding. The present invention enables the independent rotation of a separate shoulder tool and a retractable pin tool for friction stir welding. The present invention provides a versatile friction stir welding tool that is suitable for, but not limited to, applications in the aerospace industry, shipbuilding and marine industries, railway industries, automobile industry, and construction industry. The counter-rotating spindle may be used, for example, for welding aluminum and its alloys, including cast, wrought, and extruded alloys, as well as joining similar and dissimilar alloys.

In one aspect of the present invention, a counter-rotating spindle comprises a shoulder tool, a pin tool, a first motor connected with the pin tool, and a second motor connected with the shoulder tool. The pin tool is inserted in the shoulder tool. The pin tool is movable inside the shoulder tool. The first motor rotates the pin tool. The second motor rotates the shoulder tool.

In another aspect of the present invention, a friction stir welding spindle comprises a spindle housing, a nosepiece housing attached to the spindle housing, and a counter-rotating spindle inserted into the nosepiece housing. The counter-rotating spindle extends into the spindle housing.

In a further aspect of the present invention, a friction stir welding process comprises the steps of: rotating a pin tool at a first constant speed in a first direction, rotating a shoulder tool at a second constant speed in a second direction, penetrating the work-pieces with a pin of the pin tool until a shoulder of the shoulder tool contacts a surface of the work-pieces, generating frictional heat to plasticize the material of the work-pieces forming a continuous weld, and reversing the first direction of the rotation of the pin tool before retracting the pin from the material. The shoulder tool surrounds the pin tool.

These and other features, aspects and advantages of the present invention will become better understood with reference to the following drawings, description and claims.

DETAILED DESCRIPTION OF THE INVENTION

Figure 1:
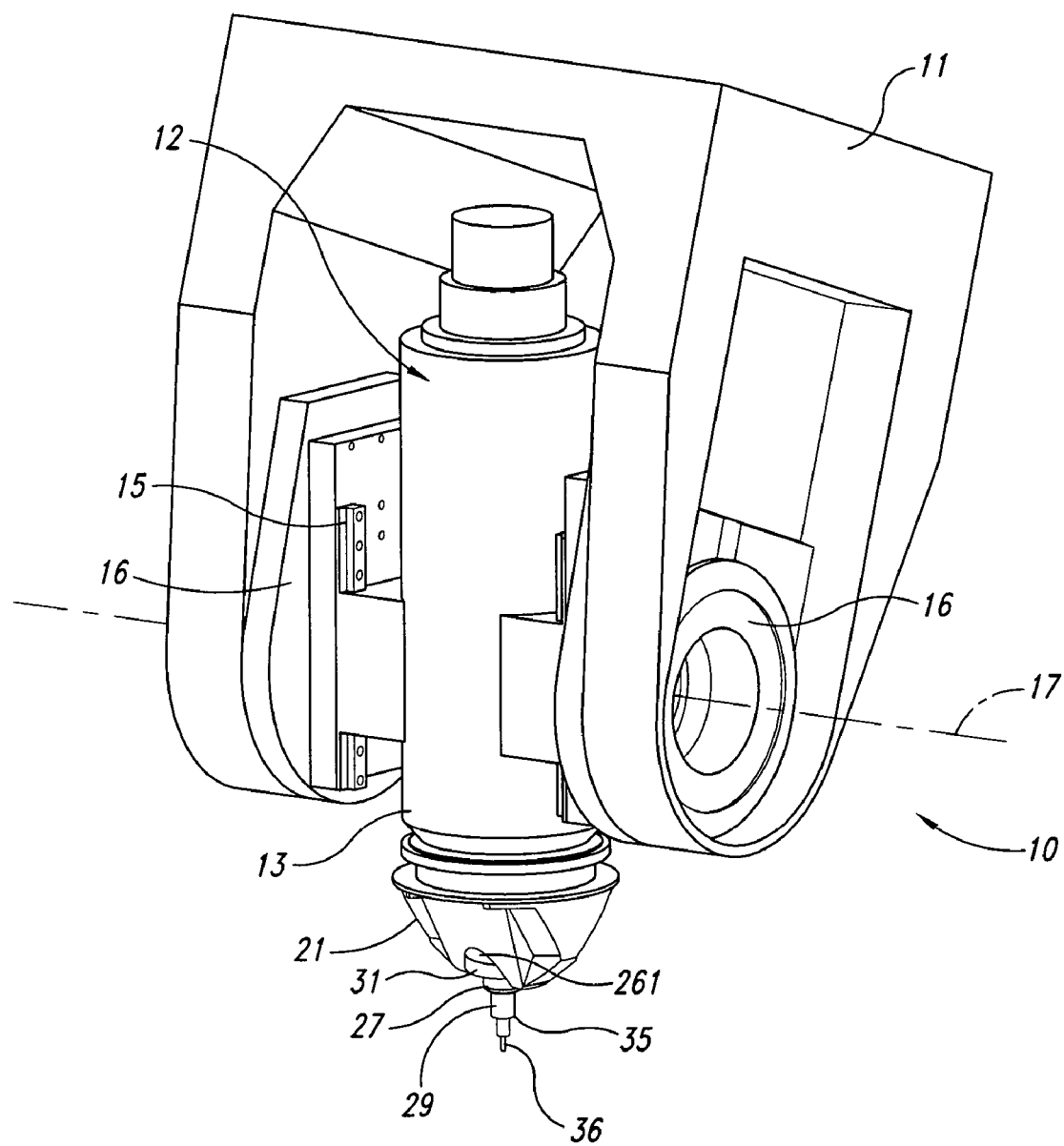
FIG. 1 is a perspective view of a friction stir welding head according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a counter-rotating spindle for friction stir welding, a continuous path friction stir welding process, and a process for spot welding. Contrary to the prior art, the counter-rotating spindle as in one embodiment of the present invention enables the independent rotation of a shoulder tool and a pin tool of a friction stir welding spindle. Consequently, the pin tool may be rotated in the same or the opposite direction as the shoulder tool and, furthermore, the pin tool may be rotated at the same or a different speed as the shoulder tool. Currently, it is only possible to rotate the pin tool and the shoulder tool simultaneously in the same direction at the same speed. An embodiment of the present invention provides a counter-rotating spindle for stir friction welding that is suitable for, but not limited to, continuous path friction stir welding and spot welding. An embodiment of the present invention provides a counter-rotating spindle for stir friction welding that is suitable for, but not limited to, applications in the aerospace industry, shipbuilding and marine industries, railway industries, automobile industry, and construction industry. The counter-rotating spindle, as in one embodiment of the present invention, may be used, for example, to weld skins to spars, ribs, and stringers for use in military and civilian aircraft. It may further be possible to use the counter-rotating spindle as in one embodiment of the present invention for producing, for example, longitudinal butt welds, lap welds, spot welds, tapered butt welds, and 5-axis contour welds, preferably, but not limited to, of aluminum alloys.

In one embodiment, the present invention provides a counter-rotating spindle for friction stir welding that is designed as a coaxial spindle and includes a retractable pin tool and a separate shoulder tool. The pin tool and the shoulder tool may be driven independently by separate motors and electronic drives enabling counter-rotation at different speeds of the pin tool and the shoulder tool. The counter-rotation and different speeds of the pin tool and the shoulder tool could prevent or at least limit a galling effect that occurs while using prior art retractable pin tools. Furthermore, driving the pin tool and the shoulder tool independently will allow to choose a lower speed for the shoulder and, therefore, overheating or melting of the work-piece surface close to the shoulder, as is possible during the operation of prior art friction stir welding tools, can be eliminated. Still further, driving the pin tool and the shoulder tool independently, as in one embodiment of the present invention, will enable optimization of the welding parameter and, therefore, the material mixing ability as well as the ability to mix dissimilar material may be improved compared to prior art friction stir welding techniques.

In one embodiment, the present invention provides a continuous path friction stir welding process that produces a weld with mechanical properties that are improved compared to welds produced with prior art friction stir welding processes. By rotating the pin tool faster than the shoulder tool during the friction stir welding process, the crushing, stirring, and forging action of the pin tool and, consequently, the microstructure of the weld may be improved over existing friction stir welding processes. Furthermore, rotating the pin tool faster than the shoulder tool may improve the welding speed, making the friction stir welding process as in one embodiment of the present invention more effective than prior art friction stir welding processes. Still further, rotating the pin tool in a direction opposite to the shoulder tool, as in one embodiment of the present invention, may further enhance the mentioned advantages of rotating the pin tool and the shoulder tool at different speeds and, furthermore, the galling effect typical for prior art friction stir welding processes using a retractable pin tool, may be eliminated.

In one embodiment, the present invention provides a spot welding process that may include the steps of rotating the pin tool in a first direction at a first speed during the penetration of the work-pieces to be welded and during the softening of the material, and rotating the pin tool in a second direction opposite to the first direction and at a second speed which may differ from the first speed during the retraction of the pin tool. By using the spot welding process as in one embodiment of the present invention it may be possible to create a high quality weld with improved mechanical properties compared with prior art friction stir welding techniques. Furthermore, reversing the direction of the rotation of the pin tool while retracting the pin tool may force the material back into the spot weld reducing the size of the spot weld surface indent or eliminating the spot weld surface indent and providing a smooth weld, which is not possible using prior art stir friction welding processes.

Figure 2:
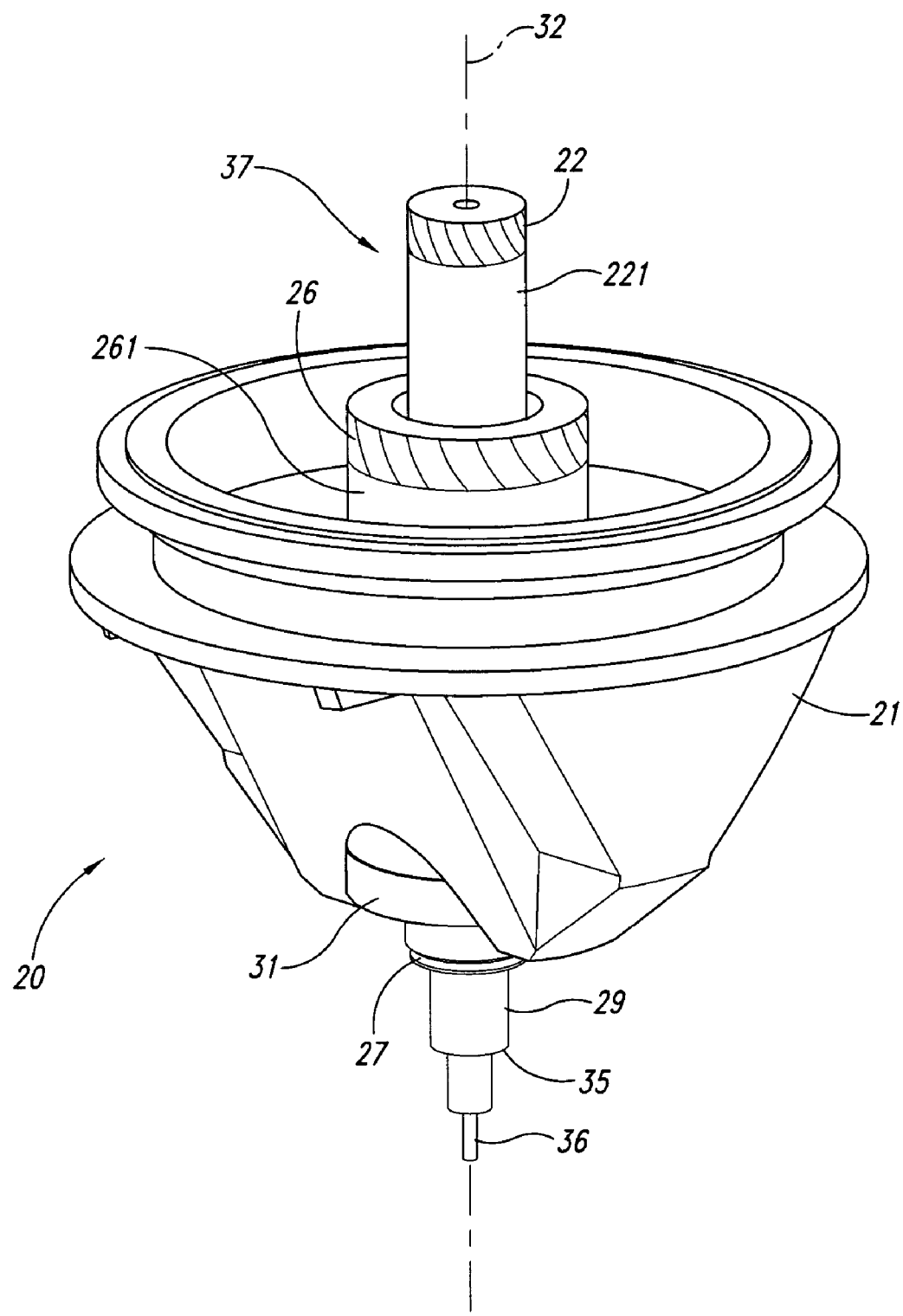
FIG. 2 is a perspective view of a nosepiece assembly according to one embodiment of the present invention.
Figure 3:
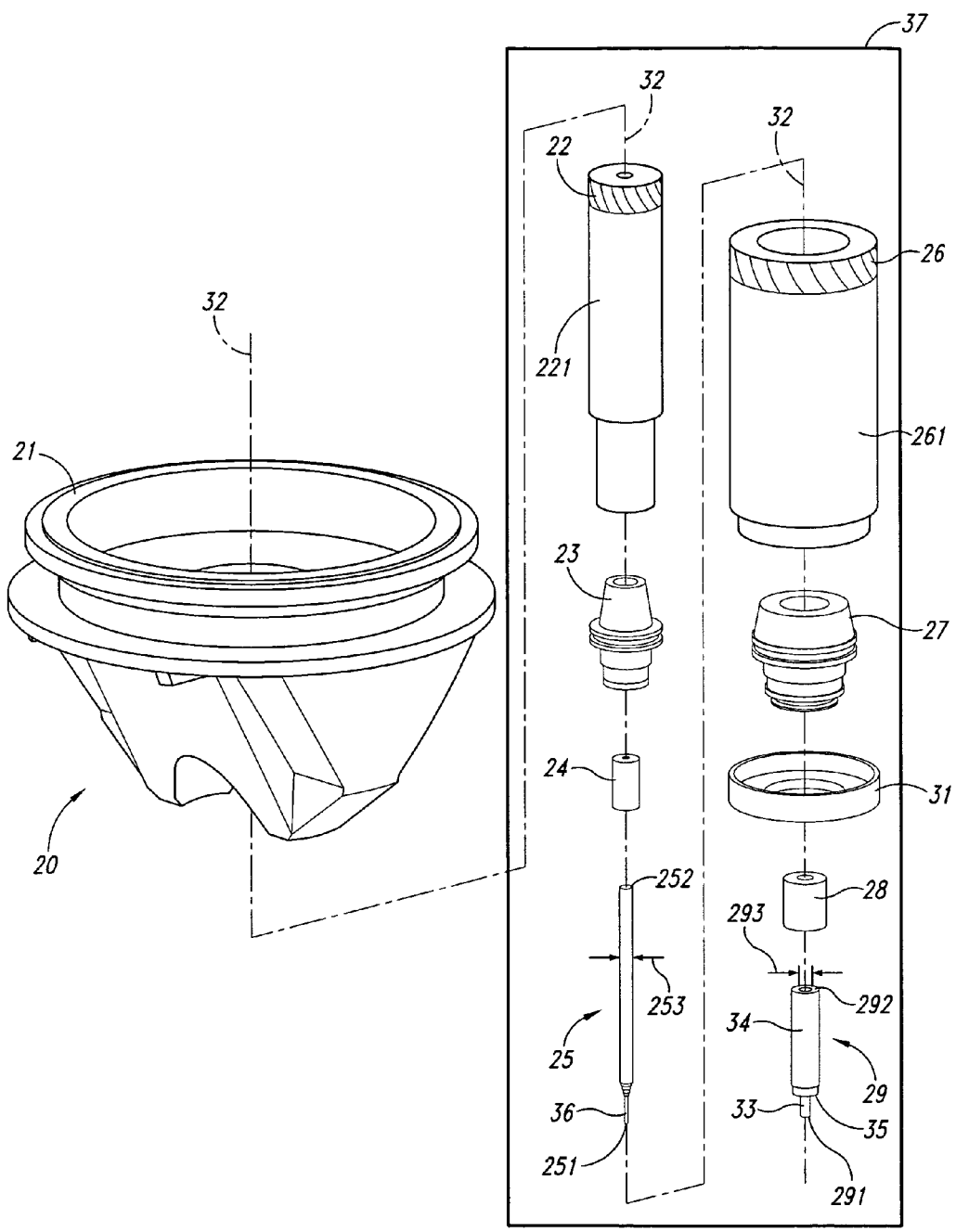
FIG. 3 is an exploded view of the nosepiece assembly illustrated in FIG. 2 according to one embodiment of the present invention.

Referring now to FIG. 1, a friction stir welding head 10 is illustrated according to one embodiment of the present invention. The friction stir welding head 10 may include a c-axis yoke 11 and a friction stir welding spindle 12. The c-axis yoke 11 may include two rails 15 and two trunnions 16. The c-axis yoke 11 may be attached to the c-axis of a numerically controlled stir friction welding machine. The rails 15 may be in a fixed connection with trunnions 16. The friction stir welding spindle 12 may include a spindle housing 13 and a nosepiece housing 21. The nosepiece housing 21 may be attached to the spindle housing 13 such that the nosepiece housing 21 may be able to rotate. The spindle housing 13 may be attached to the rails 15 such that spindle 12 may be axially moved along the rails 15 (quill-axis) and such that the spindle 12 may be rotated around a trunnion-axis 17. The friction stir welding spindle 12 may include a counter-rotating spindle 37 that may include two separate motors (22 and 26) to drive a pin tool 25 and a shoulder tool 29 independently (as shown in FIGS. 2 and 3). The spindle 12 may be used for continuous path friction stir welding as well as spot welding.

Referring now to FIGS. 2 and 3, a nosepiece assembly 20 is illustrated in assembled configuration (FIG. 2) and in an exploded view (FIG. 3) according to one embodiment of the present invention. The nosepiece assembly 20 may be part of the friction stir welding spindle 12 shown in FIG. 1. The nosepiece assembly 20 may include a nosepiece housing 21, a first motor 22, a first drive spindle 221, a first tool holder 23, a first collet 24, a pin tool 25, a second motor 26, a second drive spindle 261, a second tool holder 27, a second collet 28, a shoulder tool 29, and a union nut 31.

The pin tool 25 may have a cylindrical shape and may extend longitudinally along an axis 32 from a front end 251 to a back end 252 having an outer diameter 253. The pin tool 25 may include a pin 36 located approximately to the front end 251. The pin 36 may be threaded. During the friction stir welding process, the pin tool 25 may be preferably rotated such that the plasticized material is forced downward and backward. The first collet 24 may grip the back end 252 of the pin tool 25. The first collet 24 holding the pin tool 25 may be inserted into the first tool holder 23. The first collet 24 may ensure that the pin tool 25 stays centered along axis 32. The first tool holder 23 may connect the pin tool 25 with the first drive spindle 221. The first drive spindle 221 may connect the pin tool 25 with the first motor 22. Consequently, the first motor 22 may be used to rotate the pin tool 25.

The shoulder tool 29 may have a cylindrical shape and may extend longitudinally along the axis 32 from a front end 291 to a back end 292. The shoulder tool 29 may include a front section 33 and a back section 34. The front section 33 may have a smaller outer diameter than the back section 34 and a shoulder 35 may be formed where the front section 33 meets the back section 34. The shoulder tool 29 may be hollow and may have an inner diameter 293 that is larger than the outer diameter 253 of the pin tool 25 such that the pin tool 25 may be inserted in the shoulder tool 29 and may be movable along the axis 32 inside of the shoulder tool 29. The pin 36 may extend the shoulder tool 29 at the front end 291. The second collet 28 may grip the back end 292 of the shoulder tool 29. The second collet 28 holding the shoulder tool 29 may be inserted into the second tool holder 27. The second collet 28 may ensure that the shoulder tool 29 stays centered along axis 32. The second tool holder 27 may connect the shoulder tool 29 with the second drive spindle 261. The union nut 31 secures the second tool holder 27 to the second drive spindle 261. The second drive spindle 261 may connect the shoulder tool 29 with the second motor 26. Consequently, the second motor 26 may be used to rotate the shoulder tool 29. The shoulder tool 29, the second collet 28, the second tool holder 27, the second drive spindle 261, and the second motor 26 are hollow and extend longitudinally along axis 32 when assembled. The pin tool 25, the first collet 24, the first tool holder 23, the first drive spindle 221, and the first motor 22 may be assembled to form a first spindle extending longitudinally along the axis 32. The shoulder tool 29, the second collet 28, the second tool holder 27, the second drive spindle 261, the union nut 31, and the second motor 26 may be assembled to form a second spindle extending longitudinally along the axis 32. The first spindle may be inserted into the second spindle to form a counter-rotating spindle 37 extending longitudinally along the axis 32, as shown in FIG. 2. The counter-rotating spindle 37 may be designed as a coaxial spindle, as shown in FIGS. 2 and 3. The counter-rotating spindle 37 may be inserted into the nosepiece housing 21. The nosepiece housing 21 may be attached to the spindle housing 13 of the friction stir welding spindle 12, as shown in FIG. 1. The independent drive of the pin tool 25 and the shoulder tool 29 may also be accomplished by using a block type spindle including the first motor 22 and the second motor 26 that power the pin tool 25 and the shoulder tool 29, respectively, through a belt drive mechanism (not illustrated). The first motor 22 and the second motor 26 may be independently controlled by a computer driven numerical controller.

Due to the coaxial design of the counter-rotating spindle 37, the pin tool 25 is movable along axis 32 and, thus, the pin tool 25 may be operated as a retractable pin tool. The pin tool 25 may automatically adjust to changes in the thickness of the work-pieces to be welded and may be retracted from the work-piece at the end of the welding process incrementally and while the shoulder tool 29 maintains contact with the surface of the work-pieces. By connecting the pin tool 25 with a first motor 22 and by connecting the shoulder tool 29 with a second motor 26, the pin tool 25 and the shoulder tool 29 may be driven independently. Consequently, it may be possible to rotate the pin tool 25 and the shoulder tool 29 in opposite directions. It may further be possible to rotate the pin tool 25 and the shoulder tool 29 at different speeds. For example, rotating the pin tool 25 at a higher speed than the shoulder tool 29 may improve the mixing ability of the pin tool while reducing the risk of overheating of the work-piece surface close to the shoulder 35 of the shoulder tool 29. Rotating the pin tool 25 and the shoulder tool 29 in opposite directions may further improve the crushing, stirring, and forging action of the pin tool 25 which may result in a more effective mixing, for example, of dissimilar materials, resulting in a high quality weld with desirable mechanical properties. Furthermore, counter-rotation of the pin tool 25 and the shoulder tool 29 may reduce or eliminate galling the pin tool 25 to the shoulder tool 29, which may be caused by hot material migrating into the shaft between the pin tool 25 and the shoulder tool 29 during the friction stir welding process.

Figure 4:
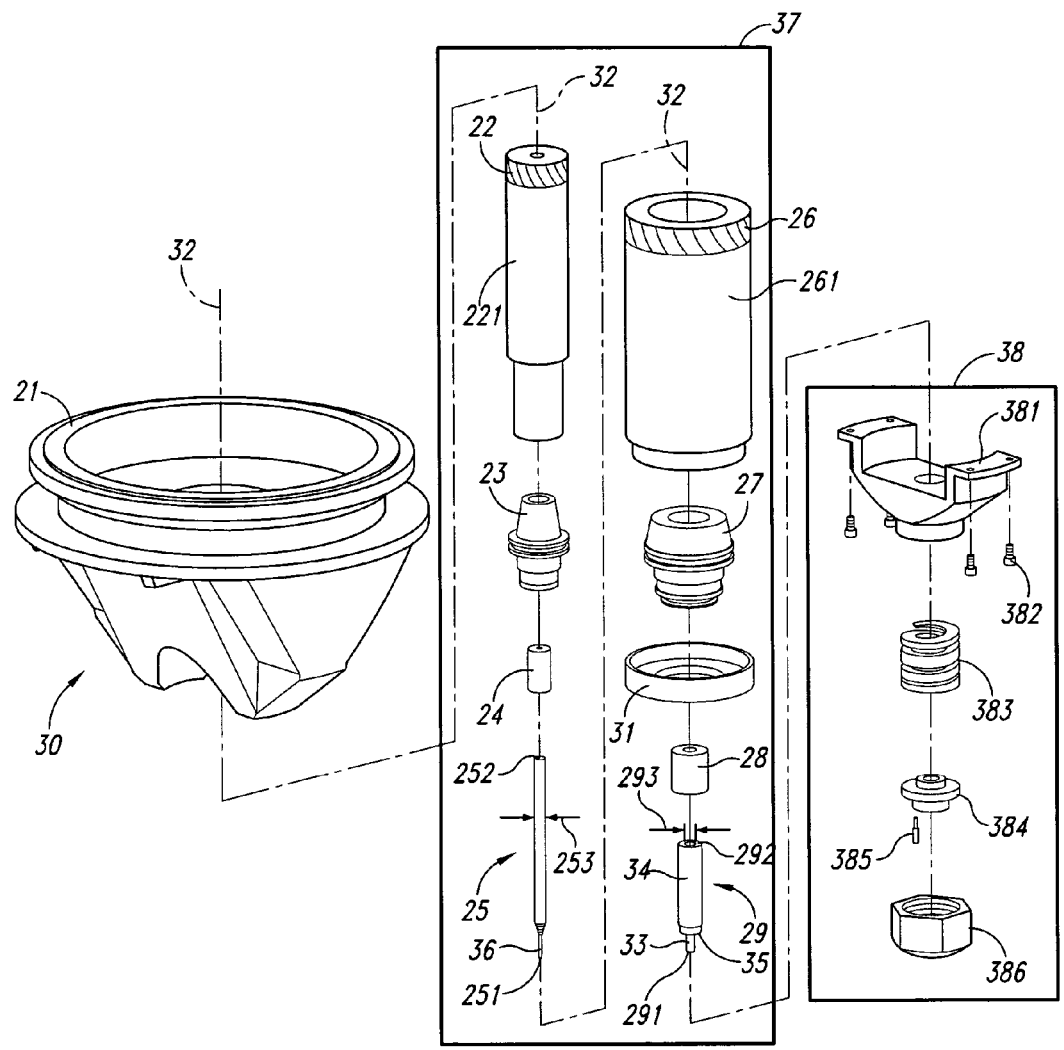
FIG. 4 is an exploded view of a nosepiece assembly for friction stir spot welding according to another embodiment of the present invention.

Referring now to FIG. 4, a nosepiece assembly 30 for friction stir spot welding is illustrated according to another embodiment of the present invention. The nosepiece assembly 30 may be part of the friction stir welding spindle 12 (shown in FIG. 1) and may be used for friction stir spot welding instead of the nosepiece assembly 20 (FIGS. 2 and 3). The nosepiece assembly 30 may include all elements of the nosepiece assembly 20 (a nosepiece housing 21, a first motor 22, a first drive spindle 221, a first tool holder 23, a first collet 24, a pin tool 25, a second motor 26, a second drive spindle 261, a second tool holder 27, a second collet 28, a shoulder tool 29, and a union nut 31), as illustrated in FIGS. 2 and 3 and as described above. The nosepiece assembly 30 may further include a pressure foot clamp assembly 38, as shown in FIG. 4. The pressure foot clamp assembly 38 may include a non-rotating fixed housing 381, attachment fasteners 382, a spring 383, a pressure foot clamp 384, an anti-roll pin 385, and a retaining cap 386. The non-rotating fixed housing 381 may be attached to the nosepiece housing 21 using the attachment fasteners 382. The spring 383 may be inserted in an opening in the housing 381. The spring 383 may be compressed using the pressure foot clamp 384. The retaining cap 386 may be attached, for example, screwed on to the housing 381 retaining the spring 383 and the pressure foot clamp 384. The spring 383 may be a commercial available spring, for example, a danly die spring #9-3214-36 with a 271 lbs./10 deflection. The function of the pressure foot clamp assembly 38 may be to capture and to retain the plasticized material from the hole caused by the pin 36 while penetrating the two work pieces.

Figure 5:
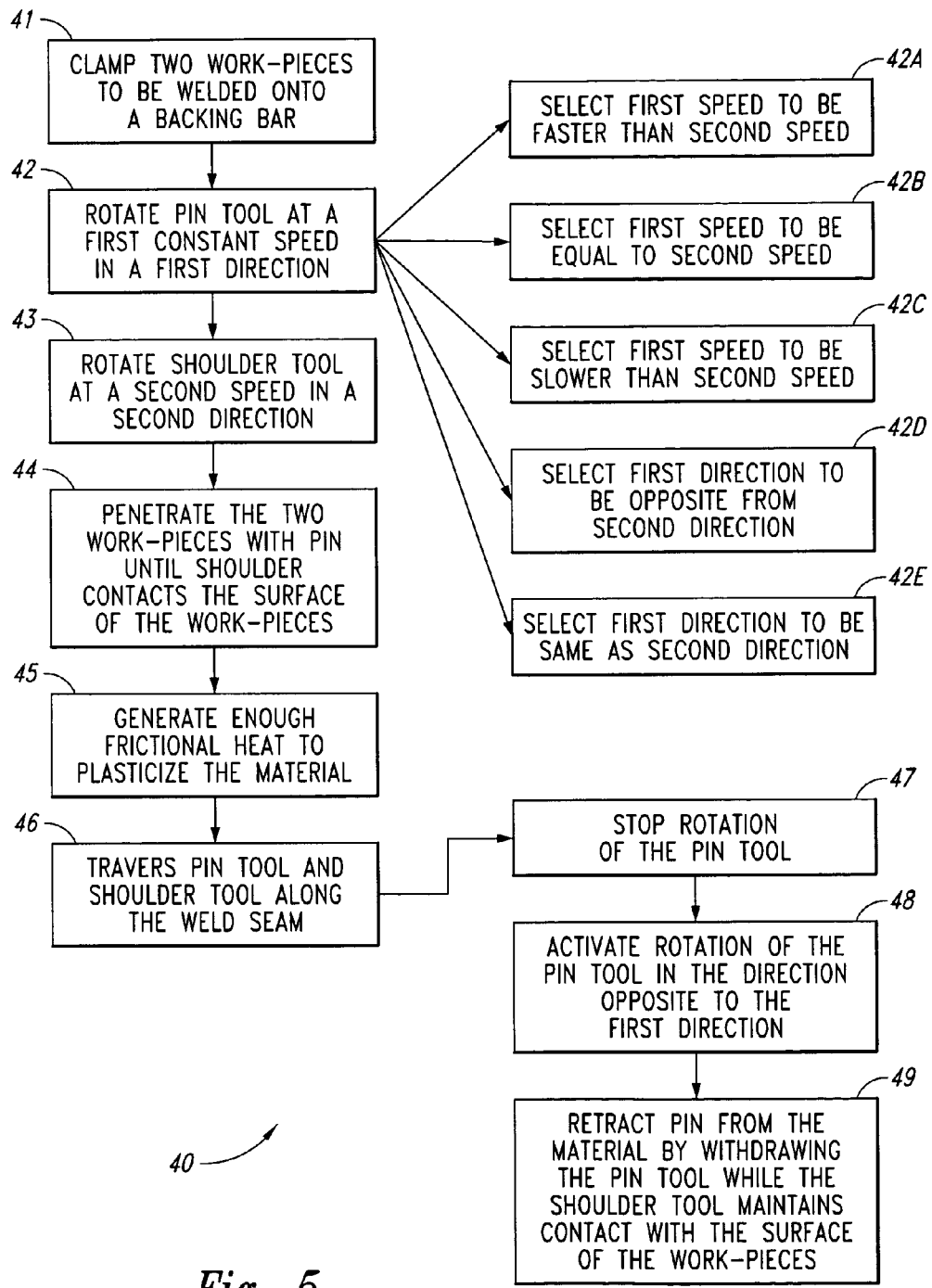
FIG. 5 is a flow chart of a friction stir welding process according to another embodiment of the present invention.

Referring now to FIG. 5, a continuous path friction stir welding process 40 is illustrated according to another embodiment of the present invention. The process 40 may include the steps of: clamping two work-pieces to be welded onto a backing bar or engineered substructure in a manner that prevents the abutting joint faces from being forced apart (step 41) and forming a weld seam, rotating the pin tool 25 at a first constant speed in a first direction (step 42), rotating the shoulder tool 29 at a second constant speed in a second direction (step 43), penetrating the two work-pieces to be welded with the pin 36 of the pin tool 25 until the shoulder 35 of the shoulder tool 29 contacts the surface of the working-pieces (step 44), and generating enough frictional heat between the shoulder 35 and the pin 36 to plasticize the material at the abutting joint faces of the two work-pieces (step 45). The shoulder 35 of the shoulder tool 29 may be used to apply pressure to the surfaces of the two work-pieces to be welded. Furthermore, the shoulder 35 may prevent the plasticized material from leaving the weld line by forcing it back into the hole made by the pin 36 as the pin tool 25 and the shoulder tool 29 traverses steadily and continuously along the weld seam in step 46. While the pin 36 traverses along the weld seam in step 46, the plasticized material is transferred from the leading edge of the pin 36 to the trailing edge and while the pin tool 25 moves away from the plasticized material, the material solidifies to become a ductile, high strength, solid-state weld. The pin 36 needs to be retracted from the work-piece at the end of the weld line (step 49). Retracting the pin from the material (step 49) may include stopping the rotation of the pin tool 25 (step 47), activating the rotation of the pin tool 25 in the opposite direction (step 48), and withdrawing the pin tool 25 while the shoulder tool 29 still maintains contact with the surface of the work-pieces (step 49). Furthermore, the rotation speed of the pin tool may be changed during the retracting step 49. By reversing the direction of the rotation of the pin tool (step 48), the extracting hole may be minimized or eliminated and the end of the weld line may have a smooth finish. The pin tool 25 may be rotated at a different speed or at the same speed as the shoulder tool 29 (steps 42A, 42B, and 42C). Rotating the pin tool 25 at a faster speed than the shoulder tool may improve the path velocity as well as the mixing ability of the pin tool 25. Counter-rotating the pin tool 25 and the shoulder tool 29 (step 42D) may optimize the mixing abilities and the mixing effectiveness of the pin 36 as well as the ability of the shoulder 35 to force the material back into the welding hole. The result may be a smooth and strong high quality weld. Furthermore, counter-rotating the pin tool 25 and the shoulder tool 29 (step 42D) may prevent or at least minimize the galling of the pin tool 25 to the shoulder tool 29 and may reduce the downtime of the welding machine caused by galling. The method 40 still allows the pin tool 25 and the shoulder tool 29 to be rotated in the same direction (step 42E). The continuous path friction stir welding process 40 may be used to produce, for example, butt joints, lab joints, "T" joints of tapered thickness, and 5-axis contour joints. The process 40 may be used to friction stir weld, for example, aluminum alloys 2024, 2124, and A357 aluminum cast material from 0.05 to 2.0 inch thickness (and variations in between). Counter-rotating the pin tool 25 and the shoulder tool 29 may also increase the mixing effectiveness, for example, in dissimilar metals.

Figure 6:
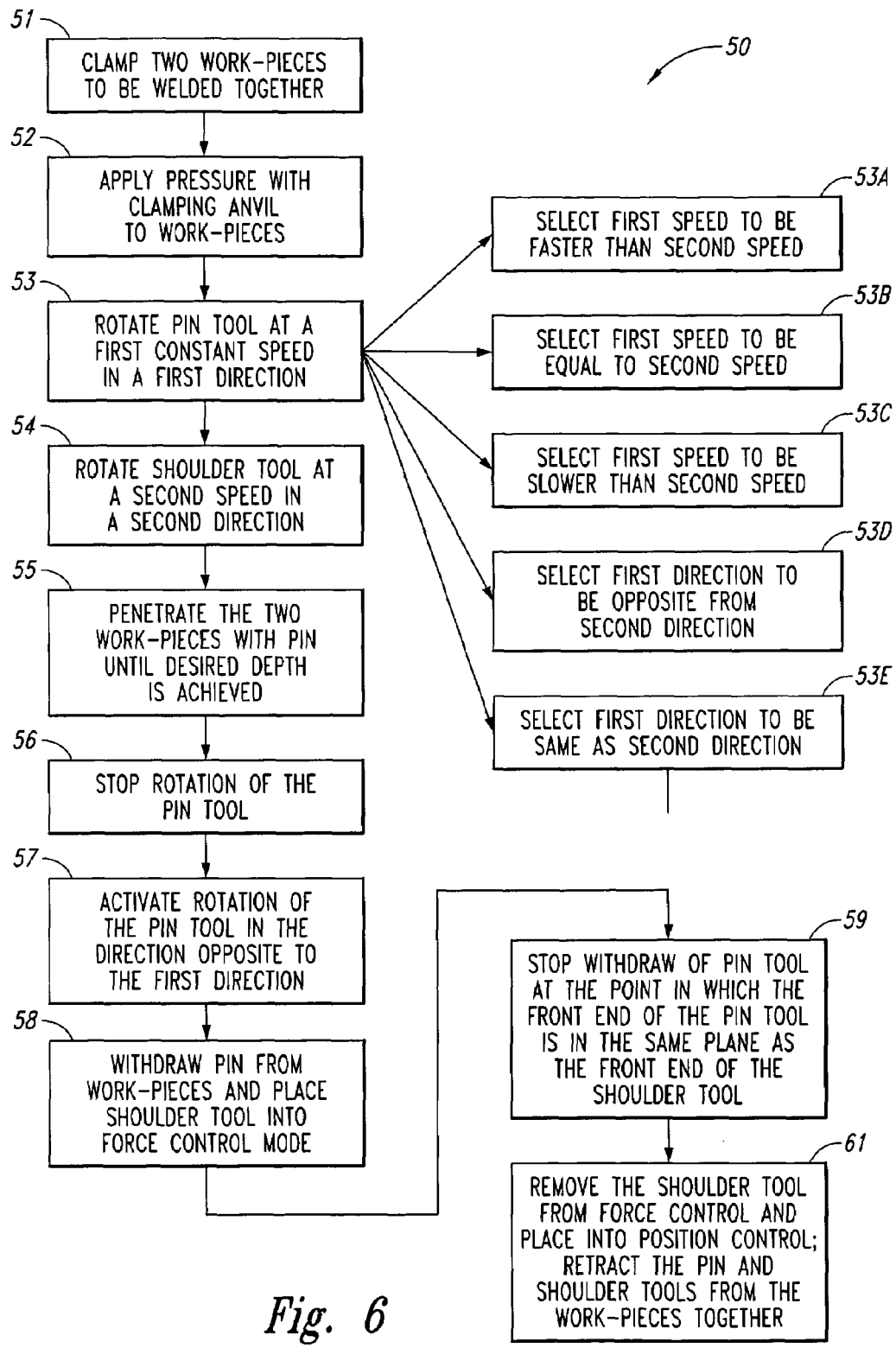
FIG. 6 is a flow chart of a friction stir spot welding process according to another embodiment of the present invention.

Referring now to FIG. 6, a friction stir spot welding process 50 is illustrated according to another embodiment of the present invention. The spot welding process 50 may include the steps of: clamping two work-pieces to be welded onto a backing bar or engineered substructure in a manner that prevents the abutting joint faces from being forced apart (step 51) and forming a weld seam, applying pressure with a clamping anvil to the work-pieces (step 52), rotating the pin tool 25 at a first speed in a first direction (step 53), rotating the shoulder tool 29 at a second speed in a second direction (step 54), penetrating the two work-pieces to be welded with the pin tool 25 until the desired depth is achieved (step 55), stopping the rotation of the pin tool 25 (step 56), activating the rotation of the pin tool 25 in the direction opposite to the first direction (step 57), and withdrawing the pin 36 from the work-pieces and placing shoulder tool 29 into force control mode (step 58). The withdrawal of the pin 36 may be stopped in step 59 at the point in which the front end 251 of the pin tool 25 is in the same plane as the front end 291 of the shoulder tool 29. The shoulder tool 29 may be removed from force control and placed into position control in step 61. It may now be possible to retract the pin tool 25 and the shoulder tool 29 from the work-pieces together. During the retraction of the pin 36 from the material (step 58), the material may be forced back into the extraction hole due to the reversed rotation of the pin tool 25 (step 57). The pin 36 may be retracted from the material incrementally (steps 58 and 61). Furthermore, the rotation speed of the pin tool 25 may be changed before the retraction in step 58 or during the retraction in step 61. By reversing the direction of the rotation of the pin tool 25 during the spot welding process 50, a weld with improved mechanical properties as well as a weld with a smooth surface may be obtained. The pin tool 25 may be rotated at a different speed or at the same speed as the shoulder tool 29 (steps 53A, 53B, and 53C). Rotating the pin tool 25 at a faster speed than the shoulder tool may improve the mixing ability of the pin tool 25. Counter-rotating the pin tool 25 and the shoulder tool 29 (step 53D) may optimize the mixing abilities and the mixing effectiveness of the pin 36, for example, for dissimilar materials, as well as the ability of the shoulder 35 to force the material back into the welding hole. Furthermore, counter-rotating the pin tool 25 and the shoulder tool 29 (step 53D) may prevent or at least minimize the galling of the pin tool 25 to the shoulder tool 29 and may reduce the downtime of the welding machine caused by galling. The method 50 still allows the pin tool 25 and the shoulder tool 29 to be rotated in the same direction (step 53E), if needed. The process 50 may be used to spot weld, for example, aluminum alloys 2024, 2124, and A357, for applications, for example, in the aerospace industry.

It should be understood, of course, that the foregoing relates to exemplary embodiments of the invention and that modifications may be made without departing from the spirit and scope of the invention as set forth in the following claims.

We claim:
1. A friction stir welding device, comprising:
a first spindle, the first spindle comprising
   a pin tool,
   a first collet connected to a back end of the pin tool and inserted into a first tool holder, the first tool holder configured to receive the first collet and to connect the first collet and the pin tool to a first drive spindle, the first drive spindle configured to connect the first tool holder to a first motor, and the first motor connected to the first drive spindle such that the first motor rotates the first drive spindle, the first tool holder, the first collet, and the pin tool around a central axis of the friction stir welding device in a first direction; and a second spindle, the second spindle comprising a shoulder tool, a second collet connected to a back end of the shoulder tool and inserted into a second tool holder, the second tool holder configured to receive the second collet and to connect the second collet and the shoulder tool to a second drive spindle via a union nut, the second drive spindle configured to connect the second tool holder to a second motor, and a second motor connected to the second drive spindle such that the second motor rotates the second drive spindle, the second tool holder, the second collet, and the shoulder tool around the central axis of the friction stir welding device in a second direction opposite the first direction, wherein the first spindle is inserted within the second spindle and is movable along the central axis within the second spindle such that the pin tool extends from and retracts within the shoulder tool while the pin tool and the shoulder tool independently rotate.

2. The friction stir welding device of claim 1, further comprising a pressure foot clamp assembly configured to capture and retain plasticized material from a hole created by the retractable pin tool while penetrating the work-piece, the pressure foot clamp assembly comprising:

a non-rotating fixed housing;

a spring inserted into an opening of the non-rotating fixed housing;

a retaining cap configured to secure to the non-rotating fixed housing, and a pressure foot clamp movably disposed between the spring and an inside surface of the retaining cap such that the pressure foot clamp compresses the spring and displaces linearly upward along the central axis when pressure is applied to a surface of the pressure foot clamp adjacent to an inside surface of the retaining cap.

3. The friction stir welding device of claim 1, wherein the shoulder tool has a cylindrical shape, a front end, and a back end, and extends longitudinally along the central axis, wherein the shoulder tool is hollow and has an inner diameter, wherein the shoulder tool includes a front section and a back section, wherein the front section has a smaller diameter than the back section, and wherein the front section and the back section form a shoulder.

4. The friction stir welding device of claim 1, wherein the retractable pin tool has a cylindrical shape, the front end, a back end and an outer diameter and extends longitudinally along the central axis, wherein the outer diameter is smaller than the inner diameter of the shoulder tool, wherein the retractable pin tool includes a pin, and wherein the pin extends from the shoulder tool.

5. The friction stir welding device of claim 4, wherein the pin is threaded.

6. A friction stir welding device, comprising:

a shoulder tool;

a retractable pin tool inserted in the shoulder tool, wherein the retractable pin tool is movable inside the shoulder tool along a central axis while rotating independently from the shoulder tool;

a first motor connected with the retractable pin tool and operative to rotate the retractable pin tool in a first direction;

a second motor connected with the shoulder tool and operative to rotate the shoulder tool in a second direction opposite the first direction, wherein the friction stir welding device is configured to retract the retractable pin tool from a work-piece being welded while the shoulder tool maintains contact with the work-piece; and a pressure foot clamp assembly configured to capture and retain plasticized material from a hole created by the retractable pin tool while penetrating the work-piece, the pressure foot clamp assembly comprising a non-rotating fixed housing, a spring inserted into an opening of the non-rotating fixed housing, a retaining cap configured to secure to the non-rotating fixed housing, and a pressure foot clamp movably disposed between the spring and an inside surface of the retaining cap such that the pressure foot clamp compresses the spring and displaces linearly upward along the central axis when pressure is applied to a surface of the pressure foot clamp adjacent to an inside surface of the retaining cap.

* * * * *